O. R. TAYLOR.
SAW SET.
APPLICATION FILED JAN. 14, 1908.

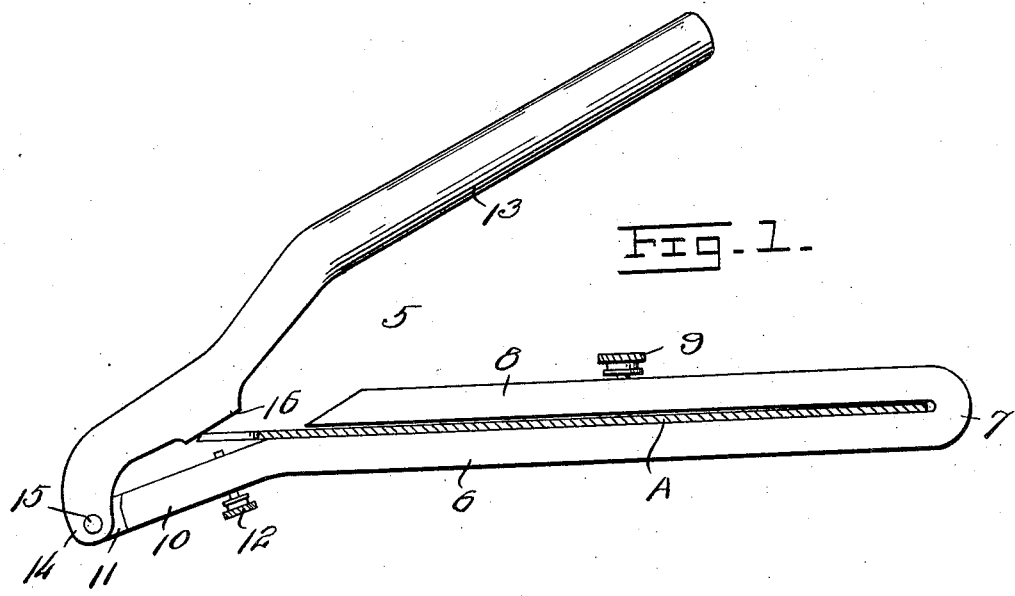
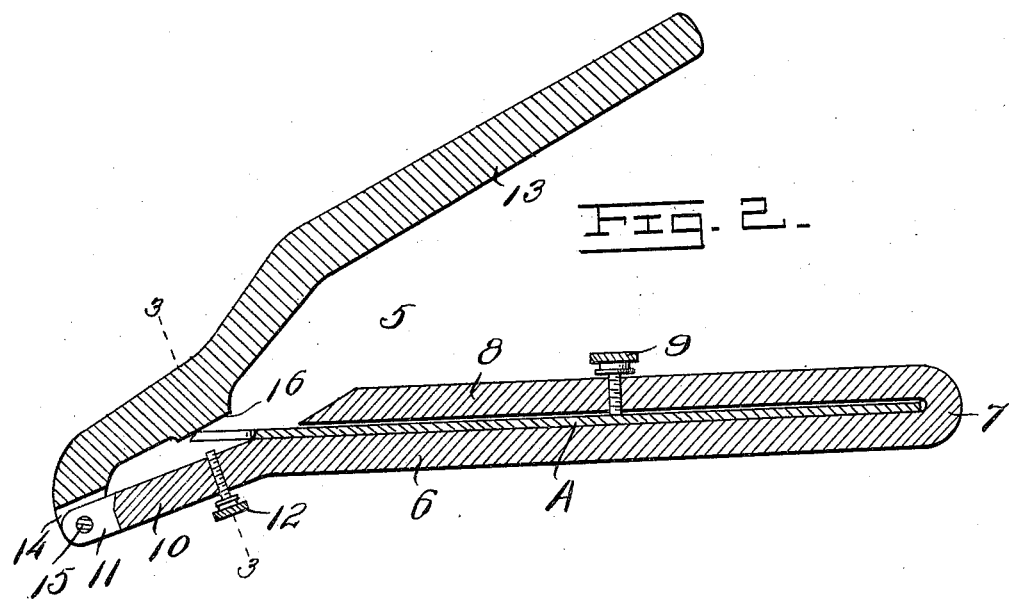

944,391.

Patented Dec. 28, 1909.
2 SHEETS—SHEET 2.

Witnesses
L. L. Armstrong.
E. L. Chandlee

Inventor
O. R. Taylor,
By Woodward & Chandlee
Attorneys

UNITED STATES PATENT OFFICE.

OSCAR R. TAYLOR, OF CANTONMENT, FLORIDA.

SAW-SET.

944,391.  Specification of Letters Patent.  Patented Dec. 28, 1909.

Application filed January 14, 1908. Serial No. 410,811.

*To all whom it may concern:*

Be it known that I, OSCAR R. TAYLOR, a citizen of the United States, residing at Cantonment, in the county of Escambia and State of Florida, have invented certain new and useful Improvements in Saw-Sets, of which the following is a specification.

This invention relates to saw sets, and has for its object to provide a simple device of this character whereby teeth of the saw may be accurately set at their proper angle.

Other objects and advantages will be apparent from the following description and it will be understood that changes in the specific structure shown and described may be made within the scope of the claim without departing from the spirit of the invention.

Figure 3:
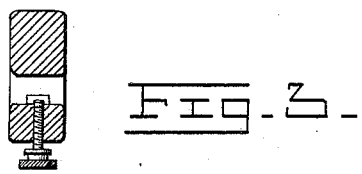
Figure 4:
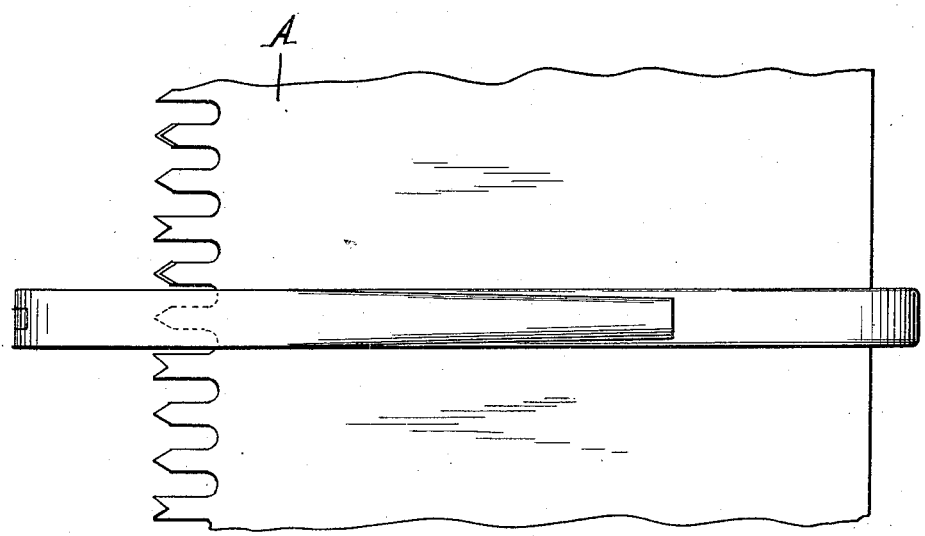

In the drawings forming a portion of this specification and in which like numerals of reference indicate similar parts in the several views, Figure 1 is a side elevational view of the present saw set, Fig. 2 is a vertical longitudinal sectional view through the same, Fig. 3 is a cross sectional view on the line 3—3 of Fig. 1, Fig. 4 is a top plan view showing the tool applied to a saw.

Referring now more particularly to the drawings, there is shown a saw set 5 including a bar of iron 6 arranged to extend beneath the blade of the saw as shown in Fig. 2 of the drawings, and at the inner end this bar is bent as shown at 7 to provide an outwardly extending and overlapping portion 8. The portion 8 is thus engaged with the outer face of the saw blade, as shown, and the two portions are disposed in parallel relation throughout their entire length so that the saw is snugly held therebetween and the proper positioning of the set upon the saw facilitated. The portion 8 is provided with a vertically disposed set screw 9 arranged to bear upon the upper side of the saw and thereby hold the saw securely between the two parts 6 and 8 respectively. The forward portion of the bar 6 is directed downwardly as shown at 10, and at the outer end, this downwardly directed portion is provided with an ear 11. The portion 8 of the bar is cut away at its forward end inwardly of the downwardly directed portion 10. The portion 10 of the bar 6 is provided with a set screw 12, and this set screw is thus arranged for adjustment to vary the angle of the teeth to be set. A hand lever 13 is provided to complete the tool, and at the forward end this handle is provided with a downwardly directed ear 14 pivoted to the ear 11 as shown at 15. Inwardly of the ear 14 the handle is enlarged as shown to provide a hammer 16. The hammer 16 is thus disposed above the downwardly directed portion 10 of the bar 6.

In use, a saw A is placed between the two members 6 and 8 respectively of the tool, and the teeth of the saw are disposed above the portion 10, as shown. The set screw 12 is afterward adjusted to set the teeth at the desired angle, and the handle 13 is operated to bring its hammer 16 in contact with one tooth of the saw. It will of course be understood that the teeth of the saw are bent alternately, and after one side of the saw has been set, the other side of the saw is set in a similar manner.

What is claimed is:

A saw set comprising a bar of metal bent upon itself to form a short upper arm and a longer spaced lower arm, the space between said arms forming an access slot adapted to snugly contain a saw blade, said longer arm forming a base, the end thereof projecting beyond said shorter arm and being angled away from said access slot and having a terminal pin opening, a lever having a curved end with a pin perforation, a pin securing said lever to the bent end of said base arm, an integral presser head extending from said lever toward said angled end, a screw serving as a limiting stop extending through said bent end, said screw being positioned in the path of said presser head, and a clamping screw threading through said shorter arm and extending into said access slot, all arranged as disclosed.

In testimony whereof I affix my signature, in presence of two witnesses.

OSCAR R. TAYLOR.

Witnesses:
 S. H. EWALT,
 EMMA E. PIERCE.